US010171441B2

United States Patent
Hsiung et al.

(10) Patent No.: US 10,171,441 B2
(45) Date of Patent: Jan. 1, 2019

(54) SYSTEM AND METHOD FOR TRANSFORMING CHANNEL ID COMMUNICATIONS IN MAN-IN-THE-MIDDLE CONTEXT

(71) Applicant: International Business Machines Corporation, Armonk, NY (US)

(72) Inventors: Wei-Hsiang Hsiung, Taipei (TW); Cheng-Ta Lee, Taipei (TW); Wei-Shiau Suen, Taichung (TW); Ming-Hsun Wu, New Taipei (TW)

(73) Assignee: International Business Machines Corporation, Armonk, NY (US)

(*) Notice: Subject to any disclaimer, the term of this patent is extended or adjusted under 35 U.S.C. 154(b) by 141 days.

(21) Appl. No.: 15/279,243

(22) Filed: Sep. 28, 2016

(65) Prior Publication Data
US 2018/0091552 A1 Mar. 29, 2018

(51) Int. Cl.
*H04L 29/06* (2006.01)
*H04L 9/32* (2006.01)
(Continued)

(52) U.S. Cl.
CPC .......... *H04L 63/061* (2013.01); *H04L 9/0643* (2013.01); *H04L 9/0841* (2013.01);
(Continued)

(58) Field of Classification Search
CPC ... H04L 63/166; H04L 63/061; H04L 9/0841; H04L 9/3066; H04L 63/0442;
(Continued)

(56) References Cited

U.S. PATENT DOCUMENTS

| 2001/0016907 A1* | 8/2001 | Kang | H04L 63/0428 713/152 |
| 2003/0177358 A1* | 9/2003 | Martin | H04L 63/061 713/171 |

(Continued)

OTHER PUBLICATIONS

Shargavan et al. Triple Handshakes and Cookie Cutters: Breaking and Fixing Authentication over TLS. IEEE Symposium on Security & Privacy, Apr. 2014, IEEE, <10.1109/SP.2014.14>.
Transport Layer Security Channel ID. In Wikipedia. Retrieved Sep. 28, 2016, from https://en.wikipedia.org/wiki/Transport_Layer_Security_Channel_ID.

*Primary Examiner* — John B King
(74) *Attorney, Agent, or Firm* — Pepper Hamilton LLP

(57) ABSTRACT

Embodiments can provide a computer implemented method in a data processing system comprising a processor and a memory comprising instructions, which are executed by the processor to cause the processor to implement a system for transforming a Channel ID communication, the method comprising: generating, by a SSL/TLS inspector, a secret; receiving, from a client, a Channel ID communication comprising a public key value; deriving, by the SSL/TLS inspector, a random seed value for a private key using the secret and the public key value of the Channel ID communication; generating, by the SSL/TLS inspector, a new private key based upon the random seed value; deriving, by the SSL/TLS inspector, a new public key based upon the new private key; generating, by the SSL/TLS inspector, a transformed Channel ID communication based upon the new private key and the new public key; and forwarding, by the SSL/TLS inspector, the transformed Channel ID communication to a server.

20 Claims, 4 Drawing Sheets

(51) Int. Cl.
  *H04L 9/08* (2006.01)
  *H04L 9/06* (2006.01)
  *H04L 9/30* (2006.01)
  H04L 29/08 (2006.01)

(52) U.S. Cl.
  CPC .......... *H04L 9/0869* (2013.01); *H04L 9/3066* (2013.01); *H04L 9/3263* (2013.01); *H04L 63/0442* (2013.01); *H04L 63/1466* (2013.01); *H04L 67/02* (2013.01); *H04L 2209/24* (2013.01)

(58) Field of Classification Search
  CPC ... H04L 9/0869; H04L 9/3263; H04L 9/0643; H04L 2209/24
  See application file for complete search history.

(56) References Cited

U.S. PATENT DOCUMENTS

| | | | |
|---|---|---|---|
| 2004/0143730 A1* | 7/2004 | Wen | G06Q 20/3674 713/150 |
| 2010/0211792 A1* | 8/2010 | Ureche | H04L 9/3247 713/176 |
| 2015/0113264 A1 | 4/2015 | Wang et al. | |
| 2015/0304847 A1* | 10/2015 | Gong | H04L 63/0869 455/411 |
| 2015/0341169 A1* | 11/2015 | Leppanen | H04L 9/0866 380/44 |
| 2015/0341317 A1 | 11/2015 | Zombik | |
| 2016/0127414 A1 | 5/2016 | Mazur et al. | |

\* cited by examiner

SYSTEM AND METHOD FOR TRANSFORMING CHANNEL ID COMMUNICATIONS IN MAN-IN-THE-MIDDLE CONTEXT

TECHNICAL FIELD

The present application relates generally to systems and methods that can be used to transform Channel ID communications for Transport Layer Security (TLS) connections.

BACKGROUND

Channel ID is a Transport Layer Security (TLS) extension for providing client side authentication in a more secured way. Traditional client side authentication attached client certificates in plain text during the TLS handshake, which has led to several identified vulnerabilities and security concerns. Channel ID uses a more secured method to send a client side identifier to a server, only allowing the real client to issue the same identifier with the correct signature.

When doing secure socket layer (SSL) inspection, a simple way to intercept a connection using Channel ID is to drop the usage of Channel ID into the ClientHello communication, leading to a less secure connection. To properly support Channel ID during SSL inspection, a method is needed that allows for sending a unique identifier with a correct signature to a server that represents the real client. However, the original identifier cannot be forwarded because there has been no previous method developed to generate the correct signature, due to the private key being owned by the real client, which is un-interceptable when performing a man-in-the-middle interception.

A previous solution was to maintain a local mapping between real identifier and fake identifier. However, a cache is needed in this solution for storing identifiers. The disadvantages of this solution were over-complexity in maintaining the local cache; poor scalability, as syncing the cache between appliances was expensive and complicated; and the total amount of TLS connections intercepted was limited by cache size. There was no unlimited storage; the cache itself will eventually run out of space. Once the available space was used up, at least one old record would require to be flushed in order to store the new record, creating a security hole. What is needed is a better solution without existing limitations to support the Channel ID extension in a TLS connection.

SUMMARY

Embodiments can provide a computer implemented method in a data processing system comprising a processor and a memory comprising instructions, which are executed by the processor to cause the processor to implement a system for transforming a Channel ID communication, the method comprising: generating, by a SSL/TLS inspector, a secret; receiving, from a client, a Channel ID communication comprising a public key value; deriving, by the SSL/TLS inspector, a random seed value for a private key using the secret and the public key value of the Channel ID communication; generating, by the SSL/TLS inspector, a new private key based upon the random seed value; deriving, by the SSL/TLS inspector, a new public key based upon the new private key; generating, by the SSL/TLS inspector, a transformed Channel ID communication based upon the new private key and the new public key; and forwarding, by the SSL/TLS inspector, the transformed Channel ID communication to a server.

Embodiments can further provide a method further comprising generating, by the SSL/TLS inspector, a secret unique to the SSL/TLS inspector; and storing the secret in a repository for later use.

Embodiments can further provide a method further comprising deriving, by the SSL/TLS inspector, a random seed value for a private key using a one-way hash algorithm that incorporates the secret and the public key value of the Channel ID communication.

Embodiments can further provide a method further comprising generating, by the SSL/TLS inspector, the new private key using an elliptic curve algorithm.

Embodiments can further provide a method further comprising generating, by the SSL/TLS inspector, the new public key using an elliptic curve algorithm.

Embodiments can further provide a method further comprising receiving, from the client, a Channel ID communication comprising a public key generated using the Elliptic Curve Diffie-Hellman key agreement protocol.

Embodiments can provide a computer implemented method in a data processing system comprising a processor and a memory comprising instructions, which are executed by the processor to cause the processor to implement a system for transforming a Channel ID communication, the method comprising: receiving, by a SSL/TLS inspector, a ClientHello communication comprising a Channel ID extension from a client; forwarding, by the SSL/TLS inspector, an unaltered ClientHello communication to a server; receiving, by the SSL/TLS inspector, a ServerHello communication from the server; forwarding, by the SSL/TLS inspector, the ServerHello communication to the client; receiving, by the SSL/TLS inspector, a certificate from the server; forwarding, by the SSL/TLS inspector, the certificate to the client; receiving, by the SSL/TLS inspector, a ServerKeyExchange communication from the server; forwarding, by the SSL/TLS inspector, the ServerKeyExchange communication to the client; receiving, by the SSL/TLS inspector, a ServerHelloDone communication from the server; forwarding, by the SSL/TLS inspector, the ServerHelloDone communication to the client; receiving, by the SSL/TLS inspector, a ClientKeyExchange communication from the client; forwarding, by the SSL/TLS inspector, the ClientKeyExchange communication to the server; receiving, by the SSL/TLS inspector, a ChangeCipherSpec communication from the client; forwarding, by the SSL/TLS inspector, the ChangeCipherSpec communication to the server; receiving, by the SSL/TLS inspector, a Channel ID communication comprising a public key value from the client; transforming, by the SSL/TLS inspector, the Channel ID communication into a transformed Channel ID communication; forwarding, by the SSL/TLS inspector, the transformed Channel ID communication to the server; receiving, by the SSL/TLS inspector, a Finished communication from the client; forwarding, by the SSL/TLS inspector, the Finished communication to the server; receiving, by the SSL/TLS inspector, a second ChangeCipherSpec communication from the server; forwarding, by the SSL/TLS inspector, the second ChangeCipherSpec communication to the client; receiving, by the SSL/TLS inspector, a second Finished communication from the server; and forwarding, by the SSL/TLS inspector, the second Finished communication to the client.

Embodiments can further provide a method further comprising generating, by the SSL/TLS inspector, a secret; deriving, by the SSL/TLS inspector, a random seed value for a private key using the secret and the public key value of the Channel ID communication; generating, by the SSL/TLS inspector, a new private key based upon the random seed value; deriving, by the SSL/TLS inspector, a new public key based upon the new private key; and generating, by the SSL/TLS inspector, a transformed Channel ID communication based upon the new private key and the new public key.

Embodiments can further provide a method further comprising generating, by the SSL/TLS inspector, a secret unique to the SSL/TLS inspector; and storing the secret in a repository for later use.

Embodiments can further provide a method further comprising deriving, by the SSL/TLS inspector, a random seed value for a private key using a one-way hash algorithm that incorporates the secret and the public key value of the Channel ID communication.

Embodiments can further provide a method further comprising generating, by the SSL/TLS inspector, the new private key using an elliptic curve algorithm.

Embodiments can further provide a method further comprising generating, by the SSL/TLS inspector, the new public key using an elliptic curve algorithm.

Embodiments can further provide a method further comprising receiving, from the client, a Channel ID communication comprising a public key generated using the Elliptic Curve Diffie-Hellman key agreement protocol.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
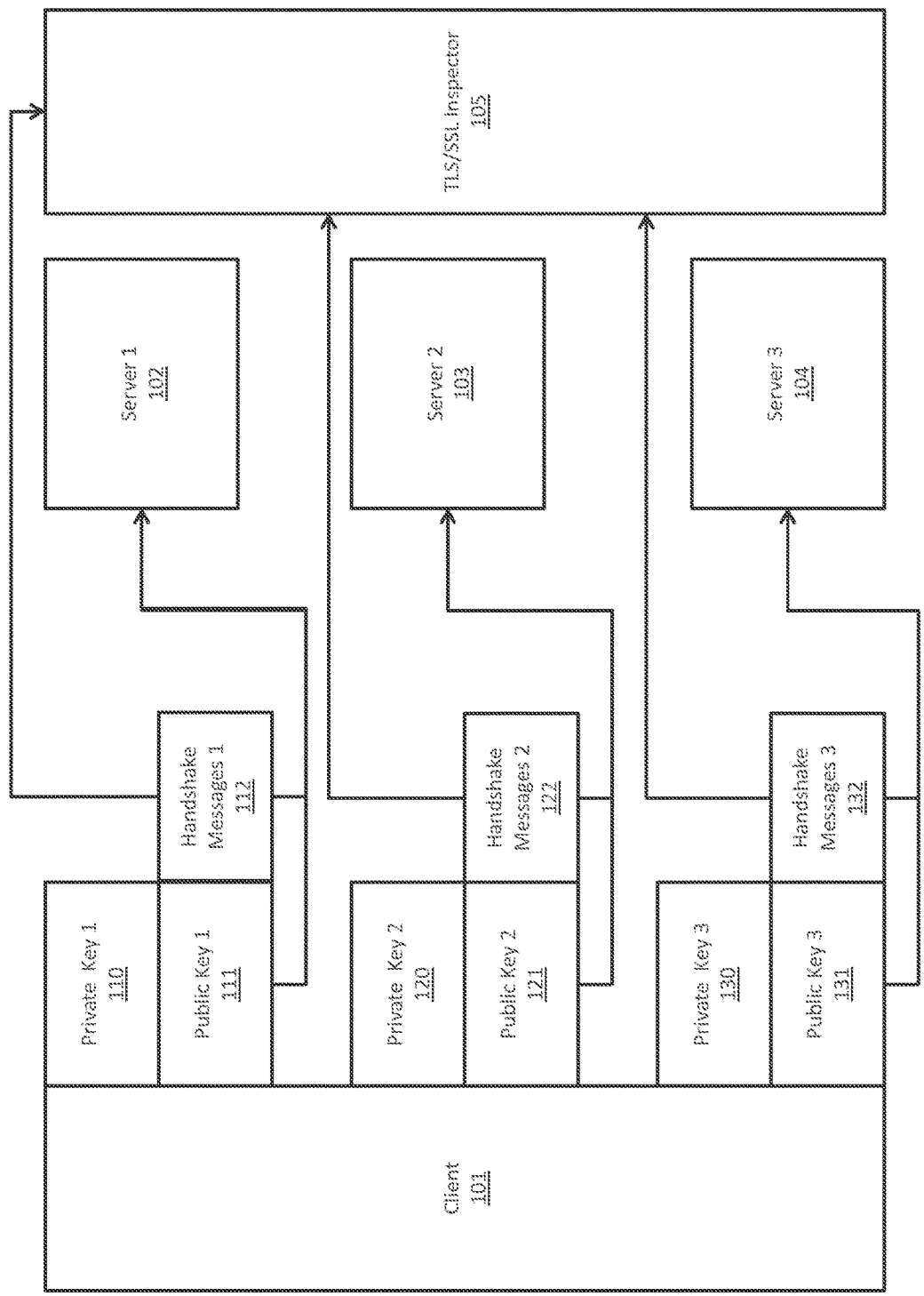
FIG. 1 depicts a schematic diagram illustrating the functionality of Channel ID, in accordance with embodiments described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

SSL/TLS communications can use certificates to identify and authenticate endpoints, which are traditionally either clients or servers. However, the client certificate mechanism is rarely applied in the real world, as certificates from a valid public key index (PKI) can be expansive and the configuration required for certification can be extremely complicated. Various providers have elected to use the "Channel ID" method to identify different clients. At its core, Channel ID involves a server-side association between an HTTP cookie with a requested client, which avoids cookie stealing. The client can be allowed to create local, self-signed certificates for each respective server.

FIG. 1 depicts a schematic diagram illustrating the functionality of Channel ID, in accordance with embodiments described herein. To enact Channel ID, a client 101, which can be an internet browser or other internet connection mechanism, can generate one or more private/public key pairs for one or more servers. FIG. 1 illustrates an implementation of Channel ID using a client 100 and three servers (server 1 102, server 2 103, and server 104). The client 101 can generate a unique private/public key pair for each server. As shown in FIG. 1, private key 1 110 and public key 1 111 can correspond to server 1 102, private key 2 120 and public key 2 121 can correspond to server 2 103, and private key 3 130 and public key 3 131 can correspond to server 3 104. In an embodiment, the private/public key pairs can be generated using the Elliptic Curve Diffie-Hellman (ECDH) key agreement protocol.

After generating the keys, the client 101 can send the public key to the respective server, which can act as the Channel ID. Additionally, the client 101 can send the signature of any TLS/SSL handshake messages that have been transmitted between the client 101 and the respective server. In FIG. 1, handshake messages 1 112 can correspond to the communications between the client 101 and server 1 102, handshake messages 2 122 can correspond to the communications between the client 101 and server 2 103, and handshake messages 3 132 can correspond to the communications between the client 101 and server 3 104. The respective server can verify the signatures sent and can additionally check if the associated cookie belongs to a given channel ID (public key).

Networks utilizing Channel ID can also involve a TLS/SSL inspector 105, which can be used to additionally inspect the TLS/SSL handshake messages and signatures as they are routed to their respective server. However, signature inspection can routinely fail because the TLS/SSL handshake messages can change as they are communicated between the client 101 and the respective servers. In order to combat this discrepancy, prior solutions generated an additional key pair for each incoming channel ID, which can lead to unwanted memory consumption.

Figure 2:
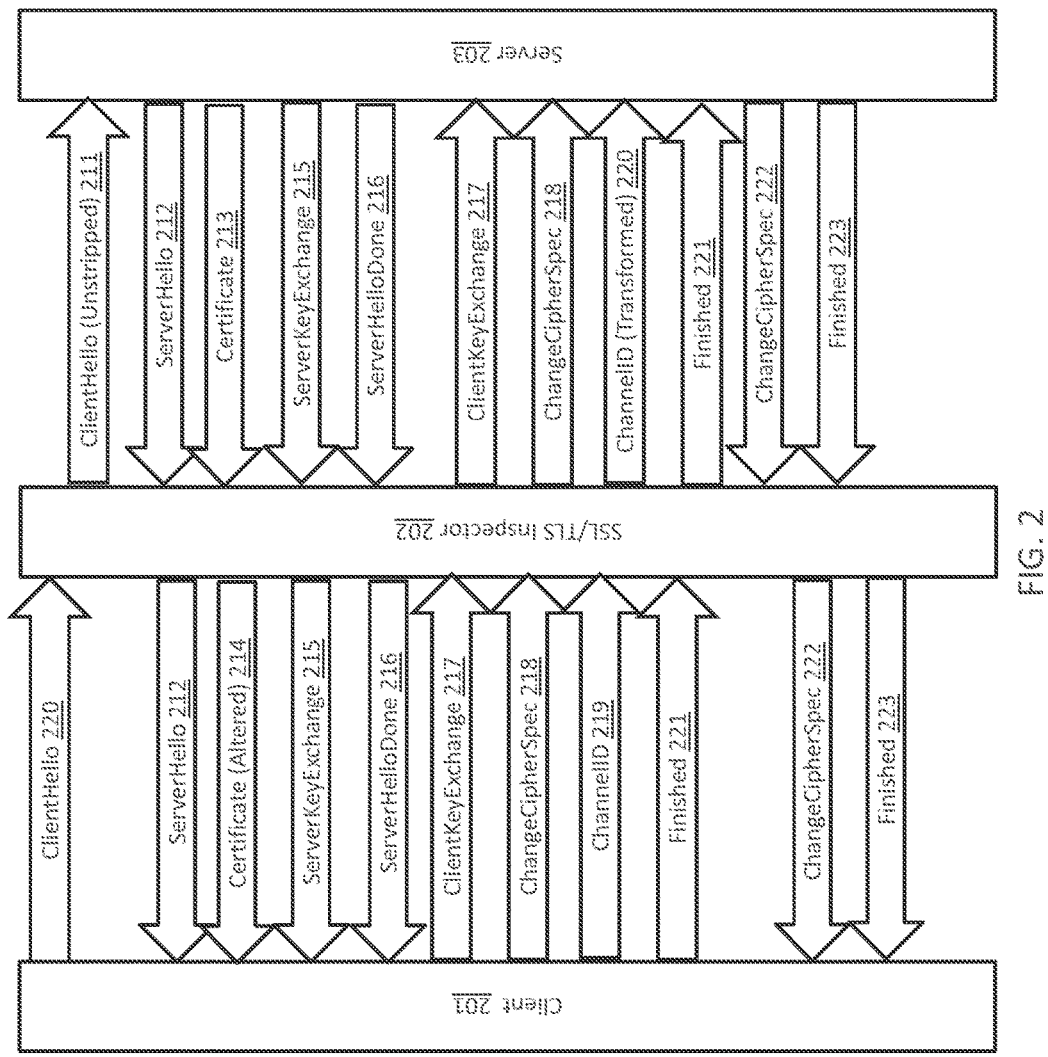
FIG. 2 illustrates exemplar handshake communications using Channel ID between client and server mediated through a SSL/TLS inspector, in accordance with embodiments described herein.

FIG. 2 illustrates exemplar handshake communications using channel ID between client 201 and server 203 mediated through a SSL/TLS inspector 202, in accordance with embodiments described herein. The SSL/TLS inspector 202 can act as a "man-in-the-middle," in that the SSL/TLS inspector 202 can intercept and/or alter communications sent between the client 201 and the server 203. All communications described herein can comprise one or more lines of code and/or one or more bits or bytes of binary data.

First, the client 201 can send a ClientHello communication 220 containing a Channel ID extension to the server 203. Upon interception by the SSL/TLS inspector 202 can forward an unstripped (i.e., the Channel ID extension is not removed) version of the ClientHello communication 211 to the server 203, meaning that the original ClientHello communication 220 can remain unaltered. The server 203 can return a ServerHello communication 212 to the client 201, along with a generated certificate 213. Upon reception by the SSL/TLS inspector 202, the certificate 213 can be altered based on the intended server, and the altered certificate 214 can be provided to the client 201. The server 203 can also provide a ServerKeyExchange communication 215 to the client 201, followed by a ServerHelloDone communication 216.

Upon reception of the ServerHelloDone communication 216 by the client 201, the client 201 can send to the server 203 a ClientKeyExchange communication 217, followed by a ChangeCipherSpec communication 218, which is used to notify that subsequent data records will be protected under the negotiated cipher specifications. The client 201 can then transmit the Channel ID communication 219, which can correspond to the prior-generated public key (as described in FIG. 1). Upon reception by the SSL/TLS inspector 202, the inspector can transform the Channel ID communication 219 in accordance with the embodiments described more fully in FIG. 3. Upon transformation, the SSL/TLS inspector 202 can forward the transformed Channel ID communication 220 to the server 203. The client 201 can send a Finished communication 221 to the server 203. To finalize the handshake communication, the server can return a second ChangeCipherSpec communication 222 to confirm the cipher specification created and a second Finished communication 223 to the client 201.

As the SSL/TLS inspector 202 can have no way to know the private key of the Channel ID communication 219, it traditionally cannot reproduce a valid Channel ID communication for the server-side connection. A traditional SSL/TLS inspector can produce a ClientHello communication without a Channel ID extension request to a real server, and thus the server can interpret the communication as the client not supporting Channel ID, therefore there would not be a Channel ID message in the following handshake. However, this practice can downgrade session security. In the embodiment described herein, the SSL/TLS inspector 202 can keep the Channel ID extension in the original ClientHello communication 220. As further described in FIG. 3, when the client 201 transmits the Channel ID communication 219, a public key can be used as a seed to do a stable transformation to generate new key pairs, assign a server-side hash with a new private key, and transmit the transformed Channel ID communication 220 to the server 203.

By using a stable transformation, the same client-based Channel ID communication 219 is always transformed to an identical new transformed Channel ID communication 220. This can keep the original Channel ID extension benefit that can allow a server 203 to identify different clients and maintain all security considerations, but avoids the scalability problem caused by storing local mappings for an increasing number of clients.

Figure 3:
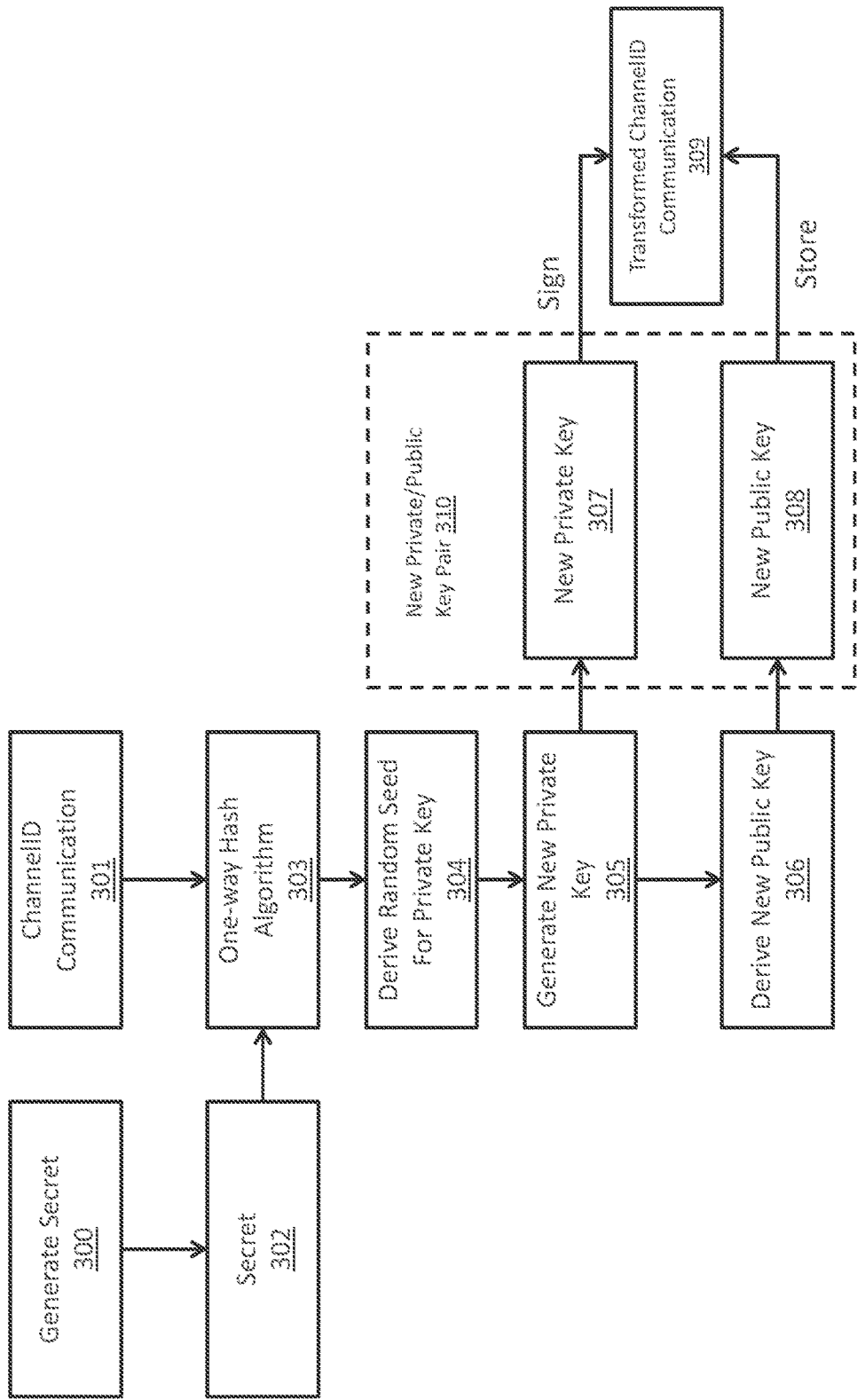
FIG. 3 depicts a flowchart illustrating a stable transformation of the Channel ID communication, in accordance with embodiments described herein.

FIG. 3 depicts a flowchart illustrating a stable transformation of the Channel ID communication, in accordance with embodiments described herein. First, the SSL/TLS inspector can generate a secret 300, which can be a strong random number. The randomized number can be unique to the particular SLL/TLS inspector. The secret 302 can be stored in a repository for repeated use. Upon receipt of a Channel ID communication 301, the inspector can derive a random seed value for a private key 304 by incorporating the secret 302 and the Channel ID value using a one-way hash algorithm 303, which can be any known cryptographic hash function. The Channel ID value can be based upon the original public key, which can use ECDH P-256 as its basis. The value can be represented as two 32-byte integers, which can indicate a coordinate location (for example, PubKey.x and PubKey.y).

Based on the seed value 304 derived using the one-way hash algorithm 303, the inspector can generate a new private key 305. In an embodiment, the generation of the new private key 305 can be accomplished using an elliptic curve algorithm, but other algorithms may be used for private key generation. In an embodiment, the relationship between the new private key 307, the secret 302, and the original Channel ID communication 301 can be expressed as: PrivKey'=SHA256(Secret|PubKey.x|PubKey.y), and can have a 32-byte length. The inspector can then derive a public key 306 that can correspond with the private key 307. The derivation of the public key 306 can be accomplished using the elliptic curve algorithm, but other algorithms may be used for public key generation. In an embodiment, the relationship between the new public key 308 and the new private key 307 can be expressed as: PubKey'=PriKey'× $G_{p-256}$. The new private key 307 and new public key 308 can be considered a new private/public key pair 310. Using the new private/public key pair 310, the inspector can generate the transformed Channel ID communication 309, which can be passed to the necessary server. The new private key 307 can be used as a signature for the transformed Channel ID communication 309, while the new public key 308 can be stored as the main component of the transformed Channel ID communication.

The process described in FIG. 3 can be repeated each time the SSL/TLS inspector receives a Channel ID communication from the client, as each Channel ID communication can contain a unique public key that corresponds to a particular server.

Figure 4:
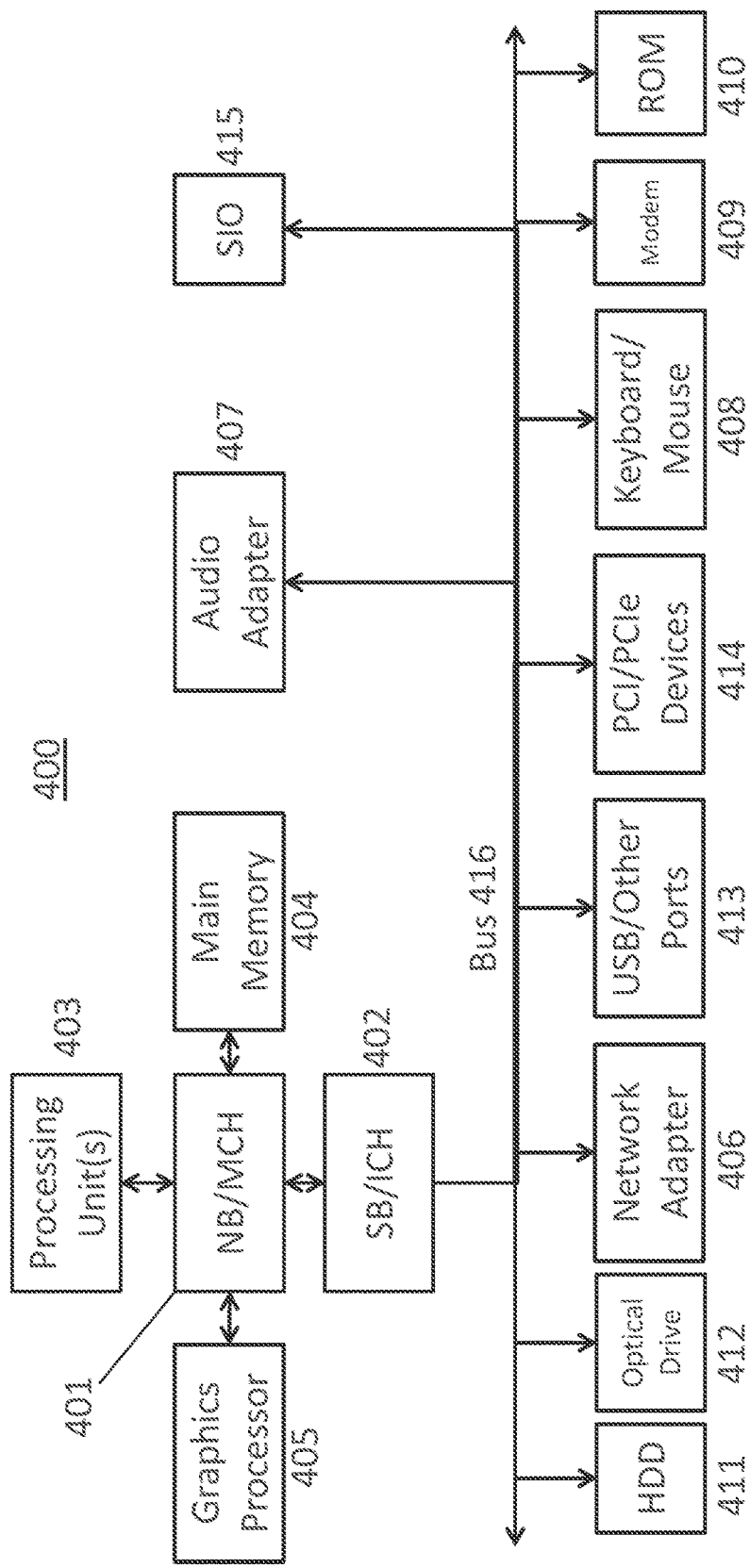
FIG. 4 is a block diagram of an example data processing system in which aspects of the illustrative embodiments may be implemented.

FIG. 4 is a block diagram of an example data processing system 400 in which aspects of the illustrative embodiments, such as the user agent, authenticator, and/or authentication server, can be implemented. Data processing system 400 is an example of a computer, such as a server or client, in which computer usable code or instructions implementing the process for illustrative embodiments of the present invention are located. In one embodiment, FIG. 4 represents a server computing device, such as a server, which implements the network tracking system described herein.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System p® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the network tracking system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

What is claimed is:

1. A computer implemented method in a data processing system comprising a processor and a memory comprising instructions, which are executed by the processor to cause the processor to implement a system for transforming a Channel ID communication, the method comprising:
  generating, by a Secure Socket Layer (SSL)/Transport Layer Security (TLS) inspector, a secret;
  receiving, from a client, the Channel ID communication comprising a public key value;
  deriving, by the SSL/TLS inspector, a random seed value for a private key using the secret and the public key value of the Channel ID communication;
  generating, by the SSL/TLS inspector, a new private key based upon the random seed value;
  deriving, by the SSL/TLS inspector, a new public key based upon the new private key;
  generating, by the SSL/TLS inspector, a transformed Channel ID communication based upon the new private key and the new public key; and
  forwarding, by the SSL/TLS inspector, the transformed Channel ID communication to a server.

2. The method as recited in claim 1, further comprising:
  generating, by the SSL/TLS inspector, the secret unique to the SSL/TLS inspector; and
  storing the secret in a repository for later use.

3. The method as recited in claim 1, further comprising:
  deriving, by the SSL/TLS inspector, the random seed value for the private key using a one-way hash algorithm that incorporates the secret and the public key value of the Channel ID communication.

4. The method as recited in claim 1, further comprising:
  generating, by the SSL/TLS inspector, the new private key using an elliptic curve algorithm.

5. The method as recited in claim 1, further comprising:
  generating, by the SSL/TLS inspector, the new public key using an elliptic curve algorithm.

6. The method as recited in claim 1, further comprising:
  receiving, from the client, the Channel ID communication comprising the public key generated using the Elliptic Curve Diffie-Hellman key agreement protocol.

7. A computer implemented method in a data processing system comprising a processor and a memory comprising instructions, which are executed by the processor to cause the processor to implement a system for transforming a Channel ID communication, the method comprising:

generating, by a Secure Socket Layer (SSL)/Transport Layer Security (TLS) inspector, a secret;
deriving, by the SSL/TLS inspector, a random seed value for a private key using the secret and a public key value of the Channel ID communication;
generating, by the SSL/TLS inspector, a new private key based upon the random seed value;
deriving, by the SSL/TLS inspector, a new public key based upon the new private key; and
generating, by the SSL/TLS inspector, a transformed Channel ID communication based upon the new private key and the new public key.

8. The method as recited in claim 7, further comprising:
receiving, by the SSL/TLS inspector, a ClientHello communication comprising a Channel ID extension from a client;
forwarding, by the SSL/TLS inspector, an unaltered ClientHello communication to a server;
receiving, by the SSL/TLS inspector, a ServerHello communication from the server;
forwarding, by the SSL/TLS inspector, the ServerHello communication to the client;
receiving, by the SSL/TLS inspector, a certificate from the server;
forwarding, by the SSL/TLS inspector, the certificate to the client;
receiving, by the SSL/TLS inspector, a ServerKeyExchange communication from the server;
forwarding, by the SSL/TLS inspector, the ServerKeyExchange communication to the client;
receiving, by the SSL/TLS inspector, a ServerHelloDone communication from the server;
forwarding, by the SSL/TLS inspector, the ServerHelloDone communication to the client;
receiving, by the SSL/TLS inspector, a ClientKeyExchange communication from the client;
forwarding, by the SSL/TLS inspector, the ClientKeyExchange communication to the server;
receiving, by the SSL/TLS inspector, a ChangeCipherSpec communication from the client;
forwarding, by the SSL/TLS inspector, the ChangeCipherSpec communication to the server;
receiving, by the SSL/TLS inspector, the Channel ID communication comprising the public key value from the client;
transforming, by the SSL/TLS inspector, the Channel ID communication into a transformed Channel ID communication;
forwarding, by the SSL/TLS inspector, the transformed Channel ID communication to the server;
receiving, by the SSL/TLS inspector, a Finished communication from the client;
forwarding, by the SSL/TLS inspector, the Finished communication to the server;
receiving, by the SSL/TLS inspector, a second ChangeCipherSpec communication from the server;
forwarding, by the SSL/TLS inspector, the second ChangeCipherSpec communication to the client;
receiving, by the SSL/TLS inspector, a second Finished communication from the server; and
forwarding, by the SSL/TLS inspector, the second Finished communication to the client.

9. The method as recited in claim 7, further comprising:
generating, by the SSL/TLS inspector, the secret unique to the SSL/TLS inspector; and
storing the secret in a repository for later use.

10. The method as recited in claim 7, further comprising:
deriving, by the SSL/TLS inspector, the random seed value for the private key using a one-way hash algorithm that incorporates the secret and the public key value of the Channel ID communication.

11. The method as recited in claim 7, further comprising:
generating, by the SSL/TLS inspector, the new private key using an elliptic curve algorithm.

12. The method as recited in claim 7, further comprising:
generating, by the SSL/TLS inspector, the new public key using an elliptic curve algorithm.

13. The method as recited in claim 7, further comprising:
receiving, from the client, the Channel ID communication comprising the public key generated using the Elliptic Curve Diffie-Hellman key agreement protocol.

14. A computer program product for transforming a Channel ID communication, the computer program product comprising a computer readable storage medium having program instructions embodied therewith, the program instructions executable by a processor to cause the processor to:
generate, by a Secure Socket Layer (SSL)/Transport Layer Security (TLS) inspector, a secret;
derive, by the SSL/TLS inspector, a random seed value for a private key using the secret and a public key value of the Channel ID communication;
generate, by the SSL/TLS inspector, a new private key based upon the random seed value;
derive, by the SSL/TLS inspector, a new public key based upon the new private key; and
generate, by the SSL/TLS inspector, a transformed Channel ID communication based upon the new private key and the new public key.

15. The computer program product as recited in claim 14, wherein the processor is further caused to:
receive, by the SSL/TLS inspector, a ClientHello communication comprising a Channel ID extension from a client;
forward, by the SSL/TLS inspector, an unaltered Client Hello communication to a server;
receive, by the SSL/TLS inspector, a ServerHello communication from the server;
forward, by the SSL/TLS inspector, the ServerHello communication to the client;
receive, by the SSL/TLS inspector, a certificate from the server;
forward, by the SSL/TLS inspector, the certificate to the client;
receive, by the SSL/TLS inspector, a ServerKeyExchange communication from the server;
forward, by the SSL/TLS inspector, the ServerKeyExchange communication to the client;
receive, by the SSL/TLS inspector, a ServerHelloDone communication from the server;
forward, by the SSL/TLS inspector, the ServerHelloDone communication to the client;
receive, by the SSL/TLS inspector, a ClientKeyExchange communication from the client;
forward, by the SSL/TLS inspector, the ClientKeyExchange communication to the server;
receive, by the SSL/TLS inspector, a ChangeCipherSpec communication from the client;
forward, by the SSL/TLS inspector, the ChangeCipherSpec communication to the server;

receive, by the SSL/TLS inspector, the Channel ID communication comprising the public key value from the client;

transform, by the SSL/TLS inspector, the Channel ID communication into a transformed Channel ID communication;

forward, by the SSL/TLS inspector, the transformed Channel ID communication to the server;

receive, by the SSL/TLS inspector, a Finished communication from the client;

forward, by the SSL/TLS inspector, the Finished communication to the server;

receive, by the SSL/TLS inspector, a second ChangeCipherSpec communication from the server;

forward, by the SSL/TLS inspector, the second ChangeCipherSpec communication to the client;

receive, by the SSL/TLS inspector, a second Finished communication from the server; and forward, by the SSL/TLS inspector, the second Finished communication to the client.

16. The computer program product as recited in claim 14, wherein the processor is further caused to:

generate, by the SSL/TLS inspector, the secret unique to the SSL/TLS inspector; and store the secret in a repository for later use.

17. The computer program product as recited in claim 14, wherein the processor is further caused to:

derive, by the SSL/TLS inspector, the random seed value for the private key using a one-way hash algorithm that incorporates the secret and the public key value of the Channel ID communication.

18. The computer program product as recited in claim 14, wherein the processor is further caused to:

generate, by the SSL/TLS inspector, the new private key using an elliptic curve algorithm.

19. The computer program product as recited in claim 14, wherein the processor is further caused to:

generate, by the SSL/TLS inspector, the new public key using an elliptic curve algorithm.

20. The computer program product as recited in claim 14, wherein the processor is further caused to:

receive, from the client, the Channel ID communication comprising the public key generated using the Elliptic Curve Diffie-Hellman key agreement protocol.

* * * * *